United States Patent
Baecher

(10) Patent No.: US 9,410,790 B2
(45) Date of Patent: Aug. 9, 2016

(54) METHOD FOR DETERMINING AN ANGLE OF ROTATION

(71) Applicant: Micronas GmbH, Freiburg (DE)

(72) Inventor: Dieter Baecher, Sexau (DE)

(73) Assignee: Micronas GmbH, Freiburg (DE)

(*) Notice: Subject to any disclaimer, the term of this patent is extended or adjusted under 35 U.S.C. 154(b) by 452 days.

(21) Appl. No.: 13/961,413

(22) Filed: Aug. 7, 2013

(65) Prior Publication Data

US 2014/0046625 A1 Feb. 13, 2014

Related U.S. Application Data

(60) Provisional application No. 61/682,990, filed on Aug. 14, 2012.

(30) Foreign Application Priority Data

Aug. 7, 2012 (DE) .......................... 10 2012 015 792

(51) Int. Cl.
| | | |
|---|---|---|
| *G01B 7/30* | (2006.01) | |
| *G01D 5/14* | (2006.01) | |
| *G01B 7/31* | (2006.01) | |
| *G01D 3/036* | (2006.01) | |

(52) U.S. Cl.
CPC ........ *G01B 7/30* (2013.01); *G01D 5/145* (2013.01); *G01B 7/31* (2013.01); *G01D 3/0365* (2013.01)

(58) Field of Classification Search
CPC ............ G01B 7/30; G01B 7/305; G01B 7/31; G01B 7/312; G01D 3/00; G01D 3/022; G01D 3/024; G01D 3/0365; G01D 5/145; G01R 5/00; G01R 7/00; G01R 15/148; G01R 15/20
USPC ........................................................ 702/151
See application file for complete search history.

(56) References Cited

U.S. PATENT DOCUMENTS

| | | |
|---|---|---|
| 5,880,586 A | 3/1999 | Dukart et al. |
| 2009/0278531 A1 | 11/2009 | Franke et al. |
| 2011/0187351 A1 | 8/2011 | Hunger |
| 2012/0095712 A1 | 4/2012 | Komasaki et al. |
| 2014/0278224 A1* | 9/2014 | Trontelj .................. G01D 5/145 702/151 |

FOREIGN PATENT DOCUMENTS

| | | |
|---|---|---|
| DE | 10 2008 010 374 A1 | 9/2009 |
| DE | 10 2011 083 249 A1 | 4/2012 |
| EP | 2 117 103 A1 | 11/2009 |
| EP | 2 354 769 A1 | 8/2011 |
| WO | WO 96/16316 | 5/1996 |

* cited by examiner

*Primary Examiner* — John Breene
*Assistant Examiner* — Lynda Dinh
(74) *Attorney, Agent, or Firm* — Muncy, Geissler, Olds & Lowe, P.C.

(57) ABSTRACT

A method for determining an angle of rotation between a sensor array and a magnetic field of a magnet, whereby the magnetic field is formed substantially parallel and perpendicular to the rotation axis, and the magnet is arranged rotationally symmetric relative to the rotation axis. A first measurement signal and a second measurement signal are generated by the two subsensors of the first magnetic field sensor unit, and the first measurement signal is assigned a first relation and the second measurement signal is assigned a second relation. A third measurement signal and a fourth measurement signal are generated by the two subsensors of the second magnetic field sensor unit, whereby the third measurement signal is assigned a third relation and the fourth measurement signal is assigned a fourth relation. The angle of rotation is then determined.

5 Claims, 2 Drawing Sheets

METHOD FOR DETERMINING AN ANGLE OF ROTATION

This nonprovisional application claims priority to German Patent Application No. DE 10 2012 015 792.4, which was filed in Germany on Aug. 7, 2012, and to U.S. Provisional Application No. 61/682,990, which was filed on Aug. 14, 2012, and which are both herein incorporated by reference.

BACKGROUND OF THE INVENTION

1. Field of the Invention

The present invention relates to a method for determining an angle of rotation.

2. Description of the Background Art

WO 96/16316, which corresponds to U.S. Pat. No. 5,880,586, discloses a method for determining an angle of rotation of a rotation axis, whereby a permanent magnet is arranged rotationally symmetric on a front of a rotation axis. To perform a contactless determination of the angle of rotation of the rotation axis, the rotating magnetic field is measured by means of two Hall sensors. The two Hall sensors are integrated into the same silicon chip and formed orthogonal to one another, i.e., at an angle of 90°, and arranged or oriented directly opposite the front of the rotation axis in such a way that one of two Hall sensors generates a signal according to the relation $Uh1=C1*I*B*\sin(\alpha)$ and the other sensor of the two Hall sensors a signal according to the relation $Uh2=C1*I*B*\cos(\alpha)$. With the assumption that the material constants C1 and C2 are more or less the same and the operating current is the same and the magnetic field components are the same, the absolute angle of rotation $\alpha$ can be determined from the relation $\alpha=\arctan(Uh1/Uh2)$.

EP 2 117 103 B1, which corresponds to US 20090278531, and which is incorporated herein by reference, discloses an arrangement of two Hall sensors, formed orthogonal to one another, for controlling an electric motor, whereby the integrated circuit has adjustable compensation means. The sensitivity of the Hall sensors and the offsets of the measurement signals of both Hall sensors are set with the compensation means. Furthermore, EP 2 354 769 A1, which corresponds to US 20110187351, and which is incorporated herein by reference, discloses an arrangement of three Hall sensors integrated into the same silicon chip and arranged orthogonal to one another. A time-consuming positioning of the sensor arrangement, i.e., a reduction of the incorrect adjustment of the three Hall sensors relative to the rotation axis, is performed by means of the measurement signal of the third magnetic field sensor to reduce an angle-dependent offset due to the incorrect adjustment on the order of 1°.

Furthermore, an arrangement of two orthogonally arranged Hall sensors within an integrated circuit is also known from the data sheet MLX90316, whereby two such integrated circuits, also called "dies," are arranged in the same plane in immediate proximity to one another on the same carrier and in the same circuit housing. This type of carrier is also called a lead frame. A first angle of rotation is calculated with the first of two Hall sensors of the first die and a second angle of rotation, shifted by 180° versus the first angle of rotation, is calculated with the second of the two Hall sensors of the second die in each case according to the aforementioned arctan function. The values for calculating the arctan function are stored in a memory.

SUMMARY OF THE INVENTION

It is therefore an object of the present invention to provide a device that refines the conventional art.

According to an embodiment of the invention, a method for determining an angle of rotation between a sensor array and a magnetic field of a magnet, the field rotatable around a rotation axis relative to the sensor array, is disclosed, whereby the magnetic field is formed parallel and perpendicular to the rotation axis, and the magnet is arranged rotationally symmetric relative to the rotation axis, and the sensor array has a first magnetic field sensor unit arranged on a first semiconductor body, and the first magnetic field sensor unit has two subsensors arranged at an angle to one another, and the sensor array has a second magnetic field sensor unit formed on a second semiconductor body, and the second magnetic field sensor unit has two subsensors arranged at an angle to one another, and the first semiconductor body and the second semiconductor body are arranged adjacent to one another on the same carrier in the same plane or in two planes parallel to one another, so that the first magnetic field sensor unit and the second magnetic field sensor unit have the same orientation relative to the rotation axis, and whereby the first magnetic field sensor unit and the second magnetic field sensor unit have a different eccentric position relative to the rotation axis, whereby a first measurement signal and a second measurement signal are generated by the two subsensors of the first magnetic field sensor unit, and the first measurement signal is assigned the relation $Uhx1(\alpha)=a*\sin(\alpha)$ and the second measurement signal is assigned the relation $Uhy1(\alpha)=b*\cos(\alpha)$, and a third measurement signal and a fourth measurement signal are generated by the two subsensors of the second magnetic field sensor unit, whereby the third measurement signal is assigned the relation $Uhx2(\alpha)=c*\sin(\alpha)$ and the fourth measurement signal is assigned the relation $Uhy2(\alpha)=d*\cos(\alpha)$, and the angle of rotation is determined with the determination of coefficients a and b and the formation of the arctan function from the quotient $UHx1(\alpha)/a/Uhy1(\alpha)/b$ with the determination of coefficients c and d and the formation of the arctan function of the quotient $UHx2(\alpha)/c/Uhy2(\alpha)/d$. It should be noted that the magnet is arranged on a front of the rotation axis and the magnet is preferably made as a diametrical magnetized disc. The disk is configured preferably circular, most preferably precisely circular. The magnet can be configured as a permanent magnet. In that the magnet is configured circular, the magnetic field lines run primarily parallel to the plane of the disk. The front of the rotation axis is turned toward the first magnetic field sensor unit and the second magnetic field sensor unit, i.e., the two dies. It should be noted further that the coefficients for an amplitude correction of the measurement signals in a first approximation are independent of the angle of rotation. Tests have shown further that the values of the coefficients change little with a lateral shift of the magnetic field sensors, i.e., with a shift within the plane. The amplitude curves of the measurement signals also deviate only slightly from the ideal sine or cosine function and can be easily corrected as a result.

An advantage of the device of the invention is that the same angle of rotation without a phase shift can be determined via the first magnetic field sensor unit and also via the second magnetic field sensor unit, although both magnetic field sensors are arranged diametrically eccentric to the rotation axis or to an imaginary extension of the rotation axis. The different position of the two magnetic field sensors with respect to the rotation axis applies both to the arrangement of the two magnetic field sensor units in one plane and to the arrangement of the two magnetic field sensor units in two planes different from one another; i.e., the rotation axis or the imaginary extension of the rotation axis does not run through the particular sensor middle for any of the two magnetic field sensor units. As a result, there is an actual redundancy with respect to the determination of the angle of rotation. Particularly, if a magnetic field sensor unit fails, the angle of rotation determined easily by the other magnetic field sensor unit based on the still functioning sensor unit without a phase shift can be used immediately and failure safety is greatly increased. A greater reliability or failure safety can be achieved particularly in the automotive sector, for example, during the determination of the angle of rotation of the camshaft and/or the angle of rotation of the crankshaft for a start/stop automatic. A further advantage is that a third subsensor is not necessary to compensate for an incorrect adjustment of the two subsensors of the particular magnetic field sensor unit.

The eccentric arrangement of the two magnetic field sensor units with respect to the imaginary extension of the rotation axis and the diametrically magnetized magnetic field disk have the effect that, for example, whereas in the case of the first magnetic field sensor unit the south pole of the magnet is in the vicinity or above the first magnetic field sensor unit, the north pole of the magnet is arranged above or in the vicinity in the case of the second magnetic field sensor unit.

Further, any angle of rotation can be determined with the same high accuracy from the determination of the coefficients, i.e., from the linearization performed thereby. For the determination of the coefficients, i.e., in order to perform an amplitude correction of the measurement signal, a comparison of the measurement signal curves with an ideal sine or cosine function can be performed both in a live system, i.e., in a real-time system during the recording of the measurement signals, and also by means of a simulation. It should be noted that the measurement signals of a precisely calibrated magnetic field sensor fulfill the relation $Uhx(\alpha)=U_0^* \sin(\alpha)$ or the relation $Uhy(\alpha)=U_0^* \cos(\alpha)$.

In an embodiment, coefficients a, b, c, and d can be determined from the deviation of the amplitudes of the particular measurement signals from a predetermined amplitude curve, preferably a sine or cosine curve. Preferably, the predetermined curve for the determination of coefficients a and b is formed as a straight line in a coordinate system of the quotient of the first measurement signal and the second measurement signal versus the arctan of the quotient of the first measurement signal and the second measurement signal. For the determination of coefficients c and d, the predetermined curve is also formed as a straight line in a coordinate system of the quotient of the third measurement signal and the fourth measurement signal versus the arctan of the quotient of the third measurement signal and the fourth measurement signal. The coefficients can be calculated according to an especially preferred embodiment by means of a processor. It is clear that the value of the coefficients depends on the particular arrangement. Determining factors here are, inter alia, the strength and size of the magnet, the distance of the magnet to the individual magnetic field sensors, and the type of magnetic field sensors. Tests have shown that the value of the individual coefficients is independent of the angle of rotation and is substantially constant especially for the particular type of application. The result here is that the coefficients can be determined before the use of the device for determining the angle of rotation, for example, in a test setup and coefficients a, b, c, and d are stored in a memory before measurement signals are generated and read from the memory during the assignment of the measurement signals to the particular relations. Tests have shown surprisingly that for an arrangement of the first magnetic field sensor unit and the second magnetic field sensor unit within a distance from the rotation axis or from the imaginary extension of the rotation axis that is less than about 50% of the radius of the circular magnets, a deviation in the particular measurement signals in comparison with the measurement signals from precisely positioned or already calibrated magnetic field sensor units is less than 5%, most preferably less than 2%. Stated differently, it became apparent surprisingly that a lateral shift in the aforementioned region has only a minor effect on the sine or cosine curve of the measurement signals. According to a refinement, the correction of the deviation can be corrected by scaling of the arctan function with the factor $Uy0/U^*0$. The already known amplification errors and offset errors can also be factored into the calibration and a precise calibration of the measurement signals can be performed.

According to an embodiment, when the two dies are made in different planes, the two different planes are formed parallel to one another. According to a refinement, the first magnetic field sensor unit and the second magnetic field sensor unit are stacked one on top of another, in that the two dies or the two semiconductor bodies are arranged on top of one another. It is preferable hereby to shift the bottom die relative to the overlying die, i.e., not to arrange them congruently over one another, in order to keep free the contact areas on the surface of the lower die and to connect electrically the contact areas of the bottom die by means of so-called bond wires. It follows from the lateral shift of the two dies relative to one another that the first magnetic field sensor unit has a different distance with respect to the rotation axis than the second magnetic field sensor unit. The different distance to the rotation axis can be compensated by the determination of the assigned coefficients in the measurement signals in such a way that a straight line results when the quotient of the first measurement signal and the second measurement signal is plotted versus the angle of rotation, i.e., the arctan value of the quotient.

According to an embodiment, the first magnetic field sensor unit and the second magnetic field sensor unit are made as Hall sensors, whereby each subsensor is configured a Hall plate, so that a magnetic field sensor unit is formed from two Hall plates arranged orthogonal to one another.

In an embodiment, an integrated circuit can be arranged in each case on the surfaces of the semiconductor bodies, whereby the integrated circuit has an electrical operative connection to the respective magnetic field sensor unit. Further, the two semiconductor bodies are arranged on the same carrier. It is understood that the carrier and the two semiconductor bodies are installed in the same IC housing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
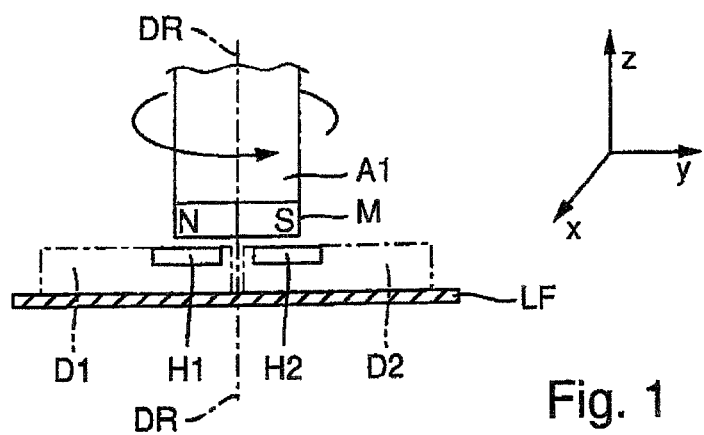
FIG. 1 is an embodiment with two adjacent magnetic field sensor units.

The illustration in FIG. 1 shows a cross section of an embodiment. On a shaft A1 with a rotation axis DR, a magnet M is arranged rotationally symmetric relative to the rotation axis on a front of shaft A1. Magnet M is formed as a permanent magnet and has a circular disk shape. Rotation axis DR is formed in the Z direction, and the disk of the magnet M is formed in the X-Y plane. Further, magnet M has a magnetization diametric in the disk direction; i.e., the north pole N and the south pole S of the magnet M are adjacent to one another in the disk direction. In the direction of an imaginary extension of the rotation axis DR on the front of shaft A1, a first semiconductor body D1 and a second semiconductor body D2 are arranged adjacent to one another in the same X-Y plane on the same carrier LF, also called a lead frame, and in each case connected force-fittingly to carrier LF, so that first magnetic field sensor unit H1 and second magnetic field sensor unit H2 have the same orientation but a different eccentric position relative to the rotation axis DR. The two semiconductor bodies D1 and D2 are also called dies. The first semiconductor body D1 has a first magnetic field sensor unit H1 on the surface and the second semiconductor body D2 has a second magnetic field sensor unit H2 on the surface. The surfaces of the two semiconductor bodies D1 and D2 face the front of the rotation axis DR. Carrier LF and the two semiconductor bodies D1 and D2 are arranged in the same IC housing. The IC housing is not shown for reasons of clarity. Each of the two magnetic field sensor units H1 and H2 has two subsensors (not shown) configured as Hall plates and arranged orthogonal to one another. The Hall plates are each formed orthogonal to the surface of the two semiconductor bodies D1 and D2. The distance of the two magnetic field sensor units H1 and H2 to the imaginary extension of rotation axis DR is less than the radius of magnet M and preferably less than 50% of the radius of magnet M. The distance is understood to be the distance between the middle of the first magnetic field sensor unit H1 or the second magnetic field sensor unit H2 to the imaginary extension of rotation axis DR. The magnetic field of the magnet runs between the front of shaft A1 and carrier LF substantially parallel to the surface of the two semiconductor bodies D1 and D2.

An operating voltage is applied at the subsensors; in a rotation of shaft A1, a first measurement signal Uhx1 and a second measurement signal Uhy1 are generated by the two subsensors of the first magnetic field sensor unit H1 and a third measurement signal UHx2 and a fourth measurement signal Uhy2 are generated by the two subsensors of the second magnetic field sensor unit H2. The first measurement signal can be described by the relation Uhx1($\alpha$)=a*sin($\alpha$), the second measurement signal by the relation Uhy1($\alpha$)=b*cos($\alpha$), the third measurement signal by the relation Uhx2($\alpha$)=c*sin($\alpha$), and the fourth measurement signal by the relation Uhy2($\alpha$)=d*cos($\alpha$). The angle of rotation can be determined both by means of the first magnetic field sensor unit H1 and also by means of the second magnetic field sensor unit with a determination of coefficients a and b and the formation of the arctan function from the quotient UHx1($\alpha$)/a/Uhy1($\alpha$)/b and a determination of coefficients c and d and the formation of the arctan function from the quotient UHx2($\alpha$)/c/Uhy2($\alpha$)/d. It is apparent that the angles of rotation determined in such a way do not have any phase shift relative to one another. According to a first alternative, coefficients a, b, c, and d are determined from the deviation of the amplitudes of the particular measurement signals from a predetermined amplitude curve. According to a second alternative, coefficients a, b, c, and d are stored in a memory before measurement signals are generated and read from the memory in the assignment of the measurement signals to the particular relations.

Figure 2:
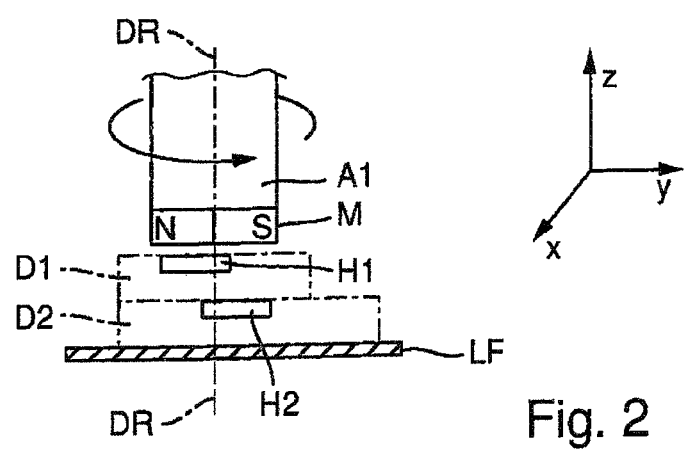
FIG. 2 is an embodiment with two magnetic field sensor units arranged in the form of a stack.

A second embodiment is shown in the illustration in FIG. 2. Only differences in regard to the illustration in FIG. 1 will be explained below. The first magnetic field sensor unit H1 and the second magnetic field sensor unit H2 are now stacked one on top of the other, whereby the bottom die is shifted relative to the overlying die; i.e., the two semiconductor bodies D1 and D2 are not arranged congruently one above the other, in order to keep free the contact areas (not shown) also on the surface of the bottom die. The contact areas of the two dies are electrically connected by means of so-called bond wires (not shown). It follows from the lateral shifting of the two dies relative to one another that the first magnetic field sensor unit H1 has a different distance with respect to rotation axis DR than the second magnetic field sensor unit H2, whereby magnetic field sensor units H1 and H2 are again arranged eccentrically relative to the imaginary extension of rotation axis DR. Both magnetic field sensor units H1 and H2 are arranged in different but parallel X-Y planes and have the same orientation with respect to rotation axis DR.

Figure 3A:
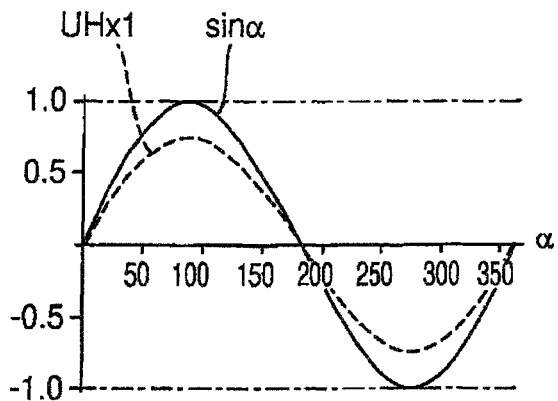
FIG. 3a illustrates a comparison of the measuring signal curve of a first subsensor of a first magnetic field sensor unit with a sine function.
Figure 3B:
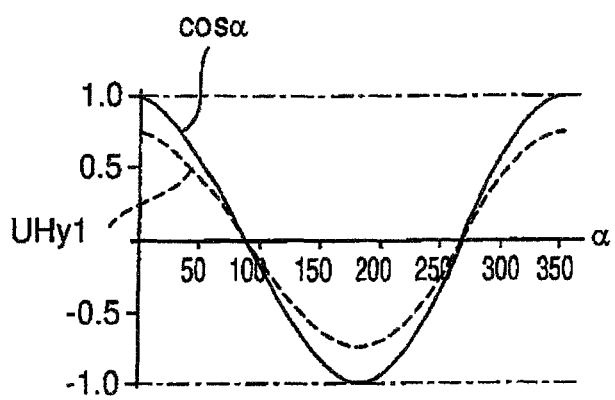
FIG. 3b illustrates a comparison of the measuring signal curve of a second subsensor of the first magnetic field sensor unit with a cosine function.

In FIG. 3a, the measurement signal of the first subsensor of the first magnetic field sensor unit H1 is shown in the example of a dashed curve of the amplitude, i.e., the measured Hall voltage Uhx1, versus the angle of rotation of axis A1 and in FIG. 3b the measurement signal of the second subsensor of the first magnetic field sensor unit H1 in the example of a dashed curve of the amplitude, i.e., the measured Hall voltage Uhy1, versus the angle of rotation of axis A1. In this case, the two amplitude curves are uncorrected, i.e., the two coefficients a and b are not determined, and the amplitude in FIG. 3a deviates from a sinusoidal curve, shown by a solid line, and the amplitude in FIG. 3b deviates from a cosinusoidal curve, shown by a solid line. Coefficients a and b can be determined from the determination of the deviation of the measured amplitudes from the sine or cosine curve, so that the signal curves of a precisely calibrated magnetic field sensor fulfill the relation Uhx($\alpha$)=$U_0$*sin($\alpha$) or the relation Uhy($\alpha$)=$U_0$*cos($\alpha$).

Figure 3C:
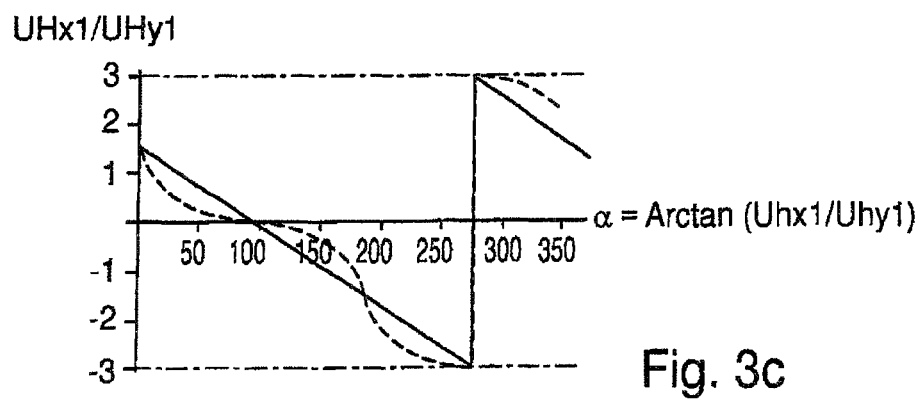
FIG. 3c illustrates a function curve of the angle of rotation according to the signal curves in FIGS. 3a and 3b.

In FIG. 3c, the quotient of the first measurement signal, shown in FIG. 3a, and the second measurement signal, shown in FIG. 3b, both in uncorrected form, shown by a dashed function course, as well as in corrected form, shown by a solid line, is plotted in each case versus the angle of rotation, i.e., the arctan value of the quotient of the first measurement signal and the second measurement signal. It is apparent that after the determination of coefficients a and b a straight curve of the function results in an area between the angle 0° and the angle 360°.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for determining an angle of rotation between a sensor array and a magnetic field of a magnet, the magnetic field being rotatable around a rotation axis relative to the sensor array, the magnetic field being substantially parallel and perpendicular to a rotation axis, and the magnet being arranged rotationally symmetric relative to the rotation axis, the method comprising:

providing the sensor array with a first magnetic field sensor unit arranged on a first semiconductor body, the first magnetic field sensor unit having two subsensors arranged at an angle to one another, the sensor array having a second magnetic field sensor unit formed on a second semiconductor body, and the second magnetic field sensor unit having two subsensors arranged at an angle to one another;

arranging the first semiconductor body and the second semiconductor body adjacent to one another on a same carrier in a same plane or in two planes substantially parallel to one another, such that the first magnetic field sensor unit and the second magnetic field sensor unit have a same orientation relative to the rotation axis, the first magnetic field sensor unit and the second magnetic field sensor unit having a different eccentric position relative to the rotation axis;

applying an operating voltage to the two subsensors of the first magnetic field sensor unit and rotating the magnet around the rotation axis to generate a first measurement signal Uhx1 and a second measurement signal Uhy1 by the two subsensors of the first magnetic field sensor unit;

assigning the first measurement signal a first relation $Uhx1(\alpha)=a*\sin(\alpha)$;

assigning the second measurement signal a second relation $Uhy1(\alpha)=b*\cos(\alpha)$;

applying the operating voltage to the two subsensors of the second magnetic field sensor unit and rotating the magnet around the rotation axis to generate a third measurement signal Uhx2 and a fourth measurement signal Uhy2 by the two subsensors of the second magnetic field sensor unit;

assigning the third measurement signal a third relation $Uhx2(\alpha)=c*\sin(\alpha)$;

assigning the fourth measurement signal a fourth relation $Uhy2(\alpha)=d*\cos(\alpha)$; and determining the angle of rotation from both the first magnetic field sensor unit and the second magnetic field sensor unit with a determination of coefficients a and b and a formation of an arctan function from a quotient $Uhx1(\alpha)/a / Uhy1(\alpha)/b$ and with a determination of coefficients c and d and a formation of an arctan function from a quotient $Uhx2(\alpha)/c / Uhy2(\alpha)/d$, wherein $\alpha$ is the angle of rotation, wherein coefficient a is the deviation of an amplitude of the first measurement signal and a predetermined amplitude curve or is stored in a memory before the first measurement signal is generated and is read from the memory during the assignment of the first measurement signal to the first relation, wherein coefficient b is the deviation of an amplitude of the second measurement signal and the predetermined amplitude curve or is stored in the memory before the second measurement signal is generated and is read from the memory during the assignment of the second measurement signal to the second relation, wherein coefficient c is the deviation of an amplitude of the third measurement signal and the predetermined amplitude curve or is stored in the memory before the third measurement signal is generated and is read from the memory during the assignment of the third measurement signal to the third relation, and wherein coefficient d is the deviation of an amplitude of the fourth measurement signal and the predetermined amplitude curve or is stored in the memory before the fourth measurement signal is generated and is read from the memory during the assignment of the fourth measurement signal to the fourth relation.

2. The computer-implemented method for determining the angle of rotation according to claim 1, wherein the first magnetic field sensor unit and the second magnetic field sensor unit are stacked one on top of another.

3. The computer-implemented method according to claim 2, wherein the first magnetic field sensor unit is offset from the the second magnetic field sensor unit.

4. The computer-implemented method for determining the angle of rotation according to claim 1, wherein the first magnetic field sensor unit and the second magnetic field sensor unit are each formed as Hall plates.

5. A computer-implemented method for determining an angle of rotation between a sensor array and a magnetic field of a magnet, the magnetic field being rotatable around a rotation axis relative to the sensor array, the magnetic field being substantially parallel and perpendicular to a rotation axis, and the magnet being arranged rotationally symmetric relative to the rotation axis, the method comprising:

providing the sensor array with a first magnetic field sensor unit arranged on a first semiconductor body, the first magnetic field sensor unit having two subsensors arranged at an angle to one another, the sensor array having a second magnetic field sensor unit formed on a second semiconductor body, and the second magnetic field sensor unit having two subsensors arranged at an angle to one another;

arranging the first semiconductor body and the second semiconductor body adjacent to one another on a same carrier in a same plane or in two planes substantially parallel to one another, such that the first magnetic field sensor unit and the second magnetic field sensor unit have a same orientation relative to the rotation axis, the first magnetic field sensor unit and the second magnetic field sensor unit having a different eccentric position relative to the rotation axis;

applying an operating voltage to the two subsensors of the first magnetic field sensor unit and rotating the magnet around the rotation axis to generate a first measurement signal Uhx1 and a second measurement signal Uhy1 by the two subsensors of the first magnetic field sensor unit;

assigning the first measurement signal a first relation $Uhx1(\alpha)=a*\sin(\alpha)$;

assigning the second measurement signal a second relation $Uhy1(\alpha)=b*\cos(\alpha)$;

applying the operating voltage to the two subsensors of the second magnetic field sensor unit and rotating the magnet around the rotation axis to generate a third measurement signal Uhx2 and a fourth measurement signal Uhy2 by the two subsensors of the second magnetic field sensor unit;

assigning the third measurement signal a third relation $Uhx2(\alpha)=c*\sin(\alpha)$;

assigning the fourth measurement signal a fourth relation $Uhy2(\alpha)=d*\cos(\alpha)$; and determining the angle of rotation from both the first magnetic field sensor unit and the second magnetic field sensor unit with a determination of coefficients a and b and a formation of an arctan function from a quotient $Uhx1(\alpha)/a / Uhy1(\alpha)/b$ and with a determination of coefficients c and d and a formation of an arctan function from a quotient $Uhx2(\alpha)/c/Uhy2(\alpha)/d$, wherein $\alpha$ is the angle of rotation, wherein coefficient a is the deviation of an amplitude of the first measurement signal and a predetermined amplitude curve, wherein coefficient b is the deviation of an amplitude of the second measurement signal and the predetermined amplitude curve, wherein coefficient c is the deviation of an amplitude of the third measurement signal and the predetermined amplitude curve, and wherein coefficient d is the deviation of an amplitude of the fourth measurement signal and the predetermined amplitude curve.

\* \* \* \* \*